United States Patent
Fabbri et al.

(10) Patent No.: US 11,652,565 B2
(45) Date of Patent: May 16, 2023

(54) TRANSPORT CABLE REDUNDANCY IN A DISTRIBUTED ANTENNA SYSTEM USING DIGITAL TRANSPORT

(71) Applicant: CommScope Technologies LLC, Hickory, NC (US)

(72) Inventors: Marianna Fabbri, Faenza (IT); Stefan Eisenwinter, Buchdorf (DE)

(73) Assignee: CommScope Technologies LLC, Hickory, NC (US)

(*) Notice: Subject to any disclaimer, the term of this patent is extended or adjusted under 35 U.S.C. 154(b) by 35 days.

(21) Appl. No.: 16/845,501

(22) Filed: Apr. 10, 2020

(65) Prior Publication Data

US 2020/0358548 A1   Nov. 12, 2020

Related U.S. Application Data

(60) Provisional application No. 62/844,032, filed on May 6, 2019.

(51) Int. Cl.
*H04B 10/07* (2013.01)
*H04B 17/00* (2015.01)
(Continued)

(52) U.S. Cl.
CPC .... *H04J 14/0278* (2013.01); *H04B 10/25753* (2013.01); *H04B 17/24* (2015.01)

(58) Field of Classification Search
CPC ............................ H04J 14/0278; H04B 17/24; H04B 10/25753
See application file for complete search history.

(56) References Cited

U.S. PATENT DOCUMENTS

| 4,451,916 A * | 5/1984 | Casper ............ H04B 10/25891 398/5 |
| 6,959,126 B1 | 10/2005 | Lofland et al. |

(Continued)

FOREIGN PATENT DOCUMENTS

| CN | 102884807 A | 1/2013 |
| CN | 103875270 A | 6/2014 |

(Continued)

OTHER PUBLICATIONS

International Searching Authority, "International Search Report and Written Opinion from PCT Application No. PCT/US2020/027640", from Foreign Counterpart to U.S. Appl. No. 16/845,501, dated Jul. 24, 2020, pp. 1 through 11, Published: WO.

(Continued)

*Primary Examiner* — Pranesh K Barua
(74) *Attorney, Agent, or Firm* — Fogg & Powers LLC

(57) ABSTRACT

A redundancy system for a distributed antenna system is provided. The system includes a first communication link, a second communication link, a first communication node and a second communication node. The first communication link traverses first path. The second communication link traverses a second path. The second path is spatially separated from the first path. The first communication node is communicatively coupled to transmit the same signal through both the first communication link and the second communication link. The second communication node has a receiver system that is communicatively coupled to receive the signals transmitted through the first and second communication links. The receiver system is configured to synchronize delay and phase differences between the received signals and then combine the signals together to generate a single output.

11 Claims, 9 Drawing Sheets

(51) Int. Cl.
  *H04J 14/02* (2006.01)
  *H04B 17/24* (2015.01)
  *H04B 10/2575* (2013.01)

(56) References Cited

U.S. PATENT DOCUMENTS

| | | | |
|---|---|---|---|
| 8,532,500 B1* | 9/2013 | Wach | H04J 14/02 398/208 |
| 8,818,192 B1 | 8/2014 | Smith et al. | |
| 8,849,111 B1 | 9/2014 | West et al. | |
| 9,240,855 B1 | 1/2016 | Lam et al. | |
| 9,425,893 B1 | 8/2016 | Srinivasan et al. | |
| 9,432,298 B1 | 8/2016 | Smith | |
| 9,635,677 B1 | 4/2017 | Liu et al. | |
| 10,284,292 B2 | 5/2019 | Hoffmann et al. | |
| 10,601,505 B2 | 3/2020 | Hoffmann et al. | |
| 2005/0152695 A1* | 7/2005 | Sulzberger | H04W 88/085 398/59 |
| 2005/0201749 A1* | 9/2005 | Wang | H04B 10/032 398/12 |
| 2007/0138417 A1 | 6/2007 | Sugiyama et al. | |
| 2007/0264009 A1 | 11/2007 | Sabat, Jr. et al. | |
| 2007/0280696 A1 | 12/2007 | Beaver | |
| 2008/0002789 A1* | 1/2008 | Jao | H04L 1/22 375/316 |
| 2008/0063411 A1 | 3/2008 | Lekkas et al. | |
| 2009/0103915 A1* | 4/2009 | Aprile | H04J 14/029 398/2 |
| 2013/0045010 A1 | 2/2013 | Mukai | |
| 2013/0294762 A1 | 11/2013 | Nonaka | |
| 2013/0343757 A1 | 12/2013 | Wigley et al. | |
| 2014/0072064 A1* | 3/2014 | Lemson | H04B 7/04 375/267 |
| 2014/0363155 A1 | 12/2014 | Kobyakov et al. | |
| 2015/0156284 A1* | 6/2015 | Akhter | H04L 69/22 370/477 |
| 2016/0135184 A1 | 5/2016 | Zavadsky et al. | |
| 2016/0295431 A1 | 10/2016 | Henry et al. | |
| 2016/0365921 A1 | 12/2016 | Costantini et al. | |
| 2017/0346549 A1* | 11/2017 | Xie | H04J 14/029 |
| 2018/0351641 A1 | 12/2018 | Hoffmann et al. | |
| 2019/0222311 A1 | 7/2019 | Hoffmann et al. | |
| 2020/0008128 A1* | 1/2020 | Lewis | H04L 41/0668 |
| 2020/0177275 A1 | 6/2020 | Hoffmann et al. | |
| 2021/0306070 A1* | 9/2021 | Shiraki | H04B 10/075 |
| 2021/0384976 A1* | 12/2021 | Torfs | H04W 88/085 |

FOREIGN PATENT DOCUMENTS

| | | |
|---|---|---|
| CN | 106209180 A | 12/2016 |
| EP | 0544989 A1 | 6/1993 |
| EP | 1025680 A2 | 8/2000 |
| KR | 20100003108 A | 1/2010 |
| KR | 101714611 B1 | 3/2017 |
| WO | 2018149557 A1 | 8/2018 |

OTHER PUBLICATIONS

European Patent Office, "Communication pursuant to Article 94(3) EPC from EP Application No. 18728865.9", from Foreign Counterpart to U.S. Appl. No. 15/904,843, dated Feb. 9, 2021, pp. 1 through 5, Published: EP.

European Patent Office, "Extended European Search Report" from EP Application No. 20801484.5, from Foreign Counterpart to U.S. Appl. No. 16/845,501, dated Nov. 22, 2022, pp. 1 through 10, Published: EP.

China National Intellectual Property Administration, "First Office Action from CN Application No. 201880033515.8", from Foreign Counterpart to U.S. Appl. No. 15/904,843, dated Jun. 29, 2021, pp. 1 through 9, Published: CN.

China National Intellectual Property Administration, "Notification for dividing the application from CN Application No. 201880033515. 8", from Foreign Counterpart to U.S. Appl. No. 15/904,843, dated Dec. 23, 2020, pp. 1 through 8, Published: CN.

"Optical Fiber Redundancy By ION-M Systems", CommScope, Inc., 2015, pp. 1-8, CommScope.com.

European Patent Office, "Communication pursuant to Rules 161(1) and 162 from EP Application No. 18728865.9", from Foreign Counterpart to U.S. Appl. No. 15/904,843, dated Jan. 10, 2020, pp. 1-3, Published: EP.

International Bureau, "International Preliminary Report on Patentability from PCT Application No. PCT/EP2018/064193", from Foreign Counterpart to U.S. Appl. No. 15/904,843, dated Dec. 12, 2019, pp. 1-13, Published: WO.

International Searching Authority, "International Search Report and Written Opinion from PCT Application No. PCT/EP2018/064193 dated Oct. 16, 2018", from Foreign Counterpart to U.S. Appl. No. 15/904,843, filed Oct. 16, 2018, pp. 1-21, Published: WO.

International Searching Authority, "Invitation to Pay Additional Fees from PCT Application No. PCT/EP2018/064193 dated Aug. 21, 2018", from Foreign Counterpart to U.S. Appl. No. 15/904,843, filed Aug. 21, 2018, pp. 1-14, Published: EP.

U.S. Patent and Trademark Office, "Notice of Allowance", U.S. Appl. No. 15/904,843, dated Oct. 15, 2018, pp. 1-8, Published: US.

U.S. Patent and Trademark Office, "Notice of Allowance", U.S. Appl. No. 15/904,843, dated Dec. 27, 2018, pp. 1-9, Published: US.

U.S. Patent and Trademark Office, "Notice of Allowance", U.S. Appl. No. 16/364,413, dated Jan. 14, 2020, pp. 1-5, Published: US.

U.S. Patent and Trademark Office, "Office Action", U.S. Appl. No. 16/364,413, dated Sep. 18, 2019, pp. 1-16, Published: US.

U.S. Patent and Trademark Office, "Office Action from U.S. Appl. No. 16/785,016 dated Aug. 19, 2020", pp. 1 through 18; Published in US.

U.S. Patent and Trademark Office, "Notice of Allowance", U.S. Appl. No. 16/785,016, dated Oct. 20, 2020, pp. 1 through 5, Published: US.

European Patent Office, "Extended European Search Report", from EP Application No. 22196539.5, from Foreign Counterpart to U.S. Appl. No. 15/904,843, dated Dec. 8, 2022, pp. 1 through 11, Published: EP.

* cited by examiner

TRANSPORT CABLE REDUNDANCY IN A DISTRIBUTED ANTENNA SYSTEM USING DIGITAL TRANSPORT

CROSS-REFERENCE TO RELATED APPLICATIONS

This Application claims priority to U.S. Provisional Application Ser. No. 62/844,032, same title herewith, filed on May 6, 2019, which is incorporated in its entirety herein by reference.

BACKGROUND

Wireless cellular service providers use base stations to implement wireless communication links with user equipment, such as mobile phones. In particular, a base station is typically in communication with one or more antennas that receive and transmit radio frequency signals to and from user equipment. Each base station in turn is in communication with the service provider's core network. The coverage area of a base station is limited by the transmit power of the associated signals. Moreover, the coverage provided by the transmitted signals is influenced by many other factors such as physical obstacles and interference. Hence, wireless coverage in buildings and stadiums has been traditionally poor when served only from conventional "macro" base stations.

One way that a wireless cellular service provider can improve the coverage provided by a given base station or group of base stations is by using a distributed antenna system (DAS). In a typical DAS, radio frequency (RF) signals are transported between a master unit and one or more remote antenna units using one or more transport cables. The master unit is communicatively coupled to one or more base stations.

Traditionally, RF signals transmitted from the base stations (also referred to here as "downlink RF signals") are received at the master unit. The master unit uses the downlink RF signals to generate one or more downlink transport signals that are distributed to one or more of the remote antenna units over the transport cables. Each such remote antenna unit receives a downlink transport signal and generates a version of the downlink RF signals based on the downlink transport signal and causes the generated downlink RF signals to be radiated from at least one antenna coupled to or included in that remote antenna unit. A similar process is performed in the uplink direction. RF signals are transmitted from user equipment (these RF signals also referred to here as "uplink RF signals"). Each such uplink RF signal is intended for a base station coupled to the master unit. Each remote antenna unit receives uplink RF signals transmitted from user equipment within its associated coverage area.

Each remote antenna unit uses the received uplink RF signals to generate an uplink transport signal that is transmitted from the remote antenna unit to the master unit. The master unit receives uplink transport signals from the various remote antenna units coupled to it. For each base station coupled to the master unit, the master unit combines uplink signals intended for that base station that are received from the various remote antenna units.

For each base station coupled to the master unit, the master unit ultimately generates uplink RF signals from the combined uplink signals for that base station, which are provided to that base station. Each remote antenna unit can be coupled to each master unit either directly or indirectly via one or more intermediate devices (such as another remote antenna unit or an expansion unit). In this way, the coverage of each base station can be expanded using the DAS.

Maintaining DAS communication coverage during emergency events is an important consideration when planning for wireless coverage in tunnels and buildings such as stadiums, airports, hotels, train stations etc. For that reason, DAS operators may be required to provide remote antenna units with connections to their master units using two redundant cables (for example two redundant fiber optic cables) laid through two different, spatially separated, paths. With this configuration, if one of the cables is compromised, communication between the remote antenna unit and the master unit can still be achieved with the other cable.

With this type of redundant cable system, both the remote antenna unit and the master unit typically include two independent receivers that are synchronized to two different signals from the two different cables. This traditional approach is expensive, when communicating digital signals, as it requires double the receivers including all digital stages as well as synchronization and switch-over circuits. Further, most applications require a very short switch-over time to keep the service established with minimal interruption. In this traditional redundant cable system approach, the switch-over time that is needed with the redundant receiver system as the result of a switch over makes it difficult to keep the service established.

SUMMARY

The following summary is made by way of example and not by way of limitation. It is merely provided to aid the reader in understanding some of the aspects of the subject matter described. Embodiments provide efficient systems and methods to process digital signals transmitted through redundant communication paths between communication components of a distributed antenna system.

In one embodiment, a redundancy system for a distributed antenna system is provided. The system includes a first communication link, a second communication link, a first communication node and a second communication node. The first communication link traverses first path. The second communication link traverses a second path. The second path is spatially separated from the first path. The first communication node is communicatively coupled to transmit the same signal through both the first communication link and the second communication link. The second communication node has a receiver system that is communicatively coupled to receive the signals transmitted through the first and second communication links. The receiver system is configured to synchronize delay and phase differences between the received signals and then combine the optical signals together to generate a single output.

In another example embodiment, a method of operating a distributed antenna system with a redundancy system that includes a first communication node and a second communication node that are in communication with each other via working signal path and a standby signal path is provided. The working signal path is spatially separated from the standby signal path. The method includes synchronizing delay and phase differences between signals in the working signal path and the standby signal path; combining the signals in the working signal path with the signals in the standby signal path to generate a single output-signal; and processing the single output signal.

In another embodiment, a redundancy system for a distributed antenna system is provided. The system includes a first communication node, at least one second communication node a communication link, at least one sensor, at least one switch and a controller. The communication link communicatively couples the first communication node to the at least one second communication node in a ring topography. The communication link has a first portion that is spatially separated from a second portion. The at least one sensor is configured to measure signal power level of communication signals in at least one of the first portion and the second portion of the communication link. The at least one switch is positioned within at least one of the first portion and the second portion of the communication link to selectively communicatively couple communication signals between the first communication node and the at least one second communication node through one of the first portion and the second portion of the communication link. The controller is in communication with the at least one sensor. The controller is configured to activate the at least one switch upon the at least one sensor measuring a signal power level in one of the first portion and the second portion of the communication link below a threshold.

In yet another embodiment, a method of operating a redundancy system for a distributed antenna system having communication nodes selectively coupled in a ring topography via at least one switch is provided. The method includes monitoring power levels of communication signals in a first portion of a communication link that communicatively couples the communication nodes in the ring topography; and when a power level is detected below a threshold, activating the at least one switch to allow communications between the communication nodes through a second portion of the communication link that is spatially separated from the first portion of the communication link.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Efficient systems to process transport signals transmitted through redundant communication paths between communication components of a distributed antenna system (DAS) is provided. One embodiment uses a dual input receiver system that requires only one timing domain, one digital filtering circuit, one digital to analog converter, etc. in a cable redundancy system where the signals have different delay phases but use the same clock and have the same signal information. Further in an embodiment, a two input stage circuit is used that is positioned to process signals from the redundant cables and provide a single output to a traditional single input receiver. The two input stage circuit synchronizes delay phases between digital signals in different paths and then adds the signals together before outputting a result to the receiver. In another embodiment, a ring configuration with a single cable path is used. This ring configuration includes at least one portion of the path being spatially separated from at least one other portion of the path. The ring configuration is designed to selectively establish communication links in both clockwise and counter clockwise directions.

It will be understood that when an element is referred to as being "coupled" to or communicatively coupled" to another element, it can be coupled or communicatively coupled directly to the other element, or intervening elements may also be present. In contrast, when an element is referred to as being "directly coupled" to another element, there are no intervening elements present.

Figure 1:
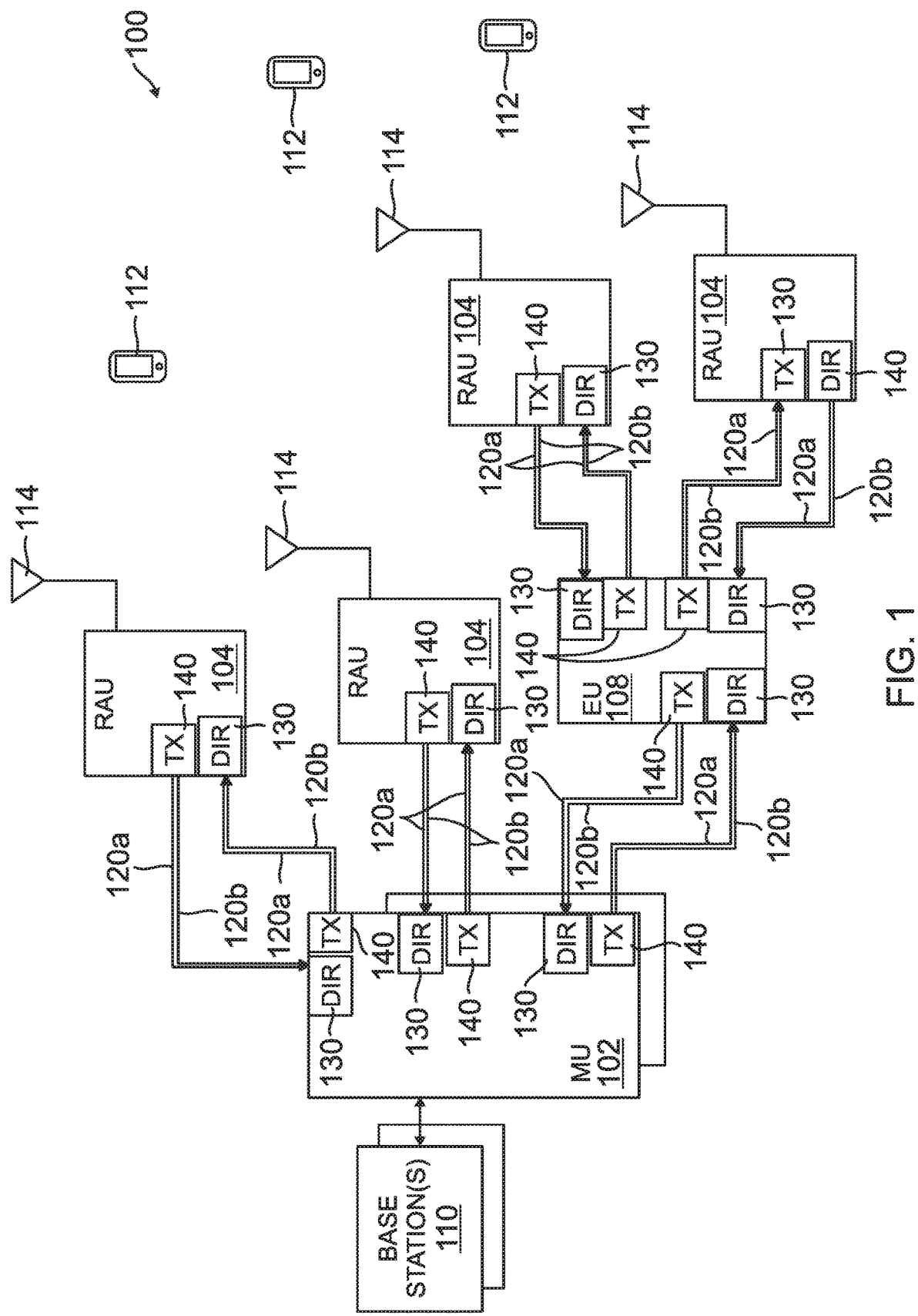
FIG. 1 is a block diagram of a distributed antenna system according to one exemplary embodiment.

An example of a DAS 100 implementing a dual input receiver system of an embodiment is illustrated in the block diagram of FIG. 1. DAS 100 comprises one or more master units 102 that are communicatively coupled to one or more remote antenna units 104 via one or more cables. The cables may be optical cables. Alternatively, the cables may be copper cables (such as coaxial cables, twisted-pair cables, or hybrid fiber-copper cables). FIG. 1 illustrates the use of dual cables (redundant optical cables) 120a and 120b communicatively coupling nodes of the DAS 100. Although, the redundant fiber optic cables 120a and 120b are illustrated as being laid next each other for ease of illustration in FIG. 1, in practice they are laid through two different, spatially separated paths.

Each remote antenna unit 104 can be communicatively coupled directly to one or more of the master units 102 or indirectly via one or more other remote antenna units 104 and/or via one or more expansion (or other intermediary) unit 108.

Each master unit 102 is communicatively coupled to one or more base stations 110. One or more of the base stations 110 can be co-located with the respective master units 102 to which they are coupled (for example, where each base station 110 is dedicated to providing base station capacity to the system 100 and is coupled to the respective master units 102). Also, one or more of the base stations 110 can be located remotely from the respective master units 102 to which it is coupled (for example, where the base station 110 provides base station capacity to more than just the coverage area of the DAS 100). In this latter case, the master unit 102 can be coupled to a donor antenna and repeater or bidirectional amplifier in order to wirelessly communicate with the remotely located base station 110.

The base stations 110 can also be coupled to the master units 102 using a network of attenuators, combiners, splitters, amplifiers, filters, cross-connects, etc., (sometimes referred to collectively as a "point-of-interface" or "POI"). This network can be included in the master units 102 and/or can be separate from the master units 102. The use of such a network is done so that, in the downlink, the desired set of RF channels output by the base stations 110 can be extracted, combined, and routed to the appropriate master units 102, and so that, in the upstream, the desired set of carriers output by the master units 102 can be extracted, combined, and routed to the appropriate interface of each base station 110. It is to be understood, however, that this is one example and that other embodiments can be implemented in other ways.

In general, each master unit 102 comprises downlink DAS circuitry that is configured to receive one or more downlink signals from one or more base stations 110. Each base station downlink signal includes one or more radio frequency channels used for communicating in the downlink direction with user equipment 112 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open RAN Alliance (ORAN) protocol, or other protocol).

The downlink DAS circuitry in each master unit 102 is also configured to generate one or more downlink transport signals derived from one or more base station downlink signals and to transmit one or more downlink transport signals to one or more of the remote antenna units 104.

Each remote antenna unit 104 comprises downlink DAS circuitry that is configured to receive the downlink transport signals transmitted to it from one or more master units 102 and to use the received downlink transport signals to generate one or more downlink radio frequency signals that are radiated from one or more coverage antennas 114 associated with that remote antenna unit 104 and/or expansion unit 108 for reception by user equipment 112. In this way, the DAS 100 increases the coverage area for the downlink capacity provided by the base stations 110.

Also, each remote antenna unit 104 and expansion unit 108 may comprises uplink DAS circuitry that is configured to receive one or more uplink radio frequency signals transmitted from the user equipment 112. These signals are analog radio frequency signals.

The uplink DAS circuitry in each remote antenna unit 104 and expansion unit may also be configured to generate one or more uplink transport signals derived from the one or more remote uplink radio frequency signals and to transmit one or more uplink transport signals to one or more of the master units 102.

Each master unit 102 comprises uplink DAS circuitry that is configured to receive the respective uplink transport signals transmitted to it from one or more remote antenna units 104 and to use the received uplink transport signals to generate one or more base station uplink radio frequency signals that are provided to the one or more base stations 110 associated with that master unit 102. Typically, this involves, among other things, combining or summing uplink signals received from multiple remote antenna units 104 in order to produce the base station signal provided to each base station 110. In this way, the DAS 100 increases the coverage area for the uplink capacity provided by the base stations 110.

In some embodiments (for example, the one shown in FIG. 1), one or more of the remote antenna units 104 are coupled to a master unit 102 via one or more intermediate units 108 (also referred to as "expansion nodes"). This can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104. The expansion units 108 are coupled to the master unit 102 and the remote antenna units 104 via one or more transport cables. Each expansion unit 108 comprises downlink DAS circuitry that is configured to receive the downlink transport signals transmitted to it from the master unit 102 (or other expansion unit 108) and transmits the downlink transport signals to one or more remote antenna units 104 or other downstream expansion units 108. Each expansion unit 108 also comprises uplink DAS circuitry that is configured to receive the respective uplink transport signals transmitted to it from one or more remote antenna units 104 or from other expansion units 108, combine or sum the received uplink transport signals, and transmit the combined uplink transport signals upstream to the master unit 102 or other expansion unit 108.

In other embodiments, one or more remote antenna units 104 are coupled to one or more master units 102 via one or more other remote antenna units 104 (for examples, where the remote antenna units 104 are coupled together in a daisy chain or ring topology).

The downlink DAS circuitry and uplink DAS circuitry in each master unit 102, remote antenna unit 104, and expansion unit 108, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry and uplink DAS circuitry may share common circuitry and/or components. In such a DAS embodiment, one or more of the master unit 102, the remote antenna unit 104, or the expansion unit 108 can be implemented at least in part using components that are mounted in a rack or sub-rack.

The DAS 100 can use digital transport for generating and communicating the transport signals between the master units 102, the remote antenna units 104, and any expansion units 108. In one embodiment, the DAS 100 is configured to use digital transport and an analog RF interface between the base stations 110 and the master units 102. In such an embodiment, downlink digital samples derived from downlink analog RF signals transmitted by the base stations 110 and uplink digital samples derived from uplink analog RF signals transmitted by user equipment 112 are generated and communicated between the master units 102 and the remote antenna units 104. The digital samples can be in the form of digital in-phase (I) and quadrature (Q) samples (though it is to be understood that other embodiments can use other forms of digital samples). Digital IQ samples can be produced from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase and quadrature samples. These digital IQ samples can also be filtered, amplified, attenuated, and/or re-sampled or decimated to a lower sample rate. The digital samples can be produced in other ways, for example by direct sampling. The portion of wireless spectrum can include, for example, a band of wireless spectrum, a sub-band of a given band of wireless spectrum, or an individual wireless carrier. Likewise, an analog RF signal can be produced from digital IQ samples by digitally up-converting the digital IQ samples to produce real digital samples, performing a digital-to-analog process on the real samples in order to produce an IF or baseband analog signal, and up-convert the IF or baseband analog signal to the desired RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal).

Instead of using an analog RF interface between the base stations 110 and each master unit 102, in some embodiments, one or more of the master units 102 interface with one or more base stations 110 using a digital interface (for example, using the CPRI serial digital IQ interface). When such a digital interface is used with a master unit 102, in the downlink direction, the master unit 102 receives one or more downstream streams of digital IQ samples from one or more base stations 110 and, if necessary, converts (by re-sampling, synchronizing, combining, separating, gain adjusting, etc.) them into downstream streams of digital IQ samples compatible with the remote antenna units 104 used in the DAS 100. In the uplink direction, the master unit 102 receives upstream streams of digital IQ samples from various remote antenna units 104, combines the digital IQ samples (for example, by digitally summing corresponding IQ samples) if necessary, converts (by re-sampling, synchronizing, combining, separating, gain adjusting, etc.) the combined digital IQ into upstream streams of digital IQ samples compatible with the one or more base stations 110, and communicates the resulting combined digital IQ samples to the one or more base stations 110.

Further illustrated in FIG. 1 are transmitters (TX) 140 and dual input receivers (DIR) 130 used for communication across the transport cables 120a and 120b. As used here, a "transmitter" refers to the circuitry in the relevant node of the DAS 100 that generates the transport signals for communication to at least one other node of the DAS 100 over the relevant transport cables. As used here, a "receiver" refers to the circuitry in the relevant node of the DAS 100 that receives the transport signal communicated to that node over the relevant transport cables from another node of the DAS 100, recovers a clock from either of the received transport signals and extracts the digital samples communicated via the transport signal. Moreover, in the particular embodiment described below, the "receiver" also includes the circuitry that synchronizes a local clock used by the receiver circuitry to the recovered clock, processes the digital samples (for example, by filtering, amplifying, attenuating, combining, re-sampling, and/or interpolating the digital samples), and, if needed, performs digital-to-analog conversion of the processed digital samples to produce one or more analog signals.

Figure 2:
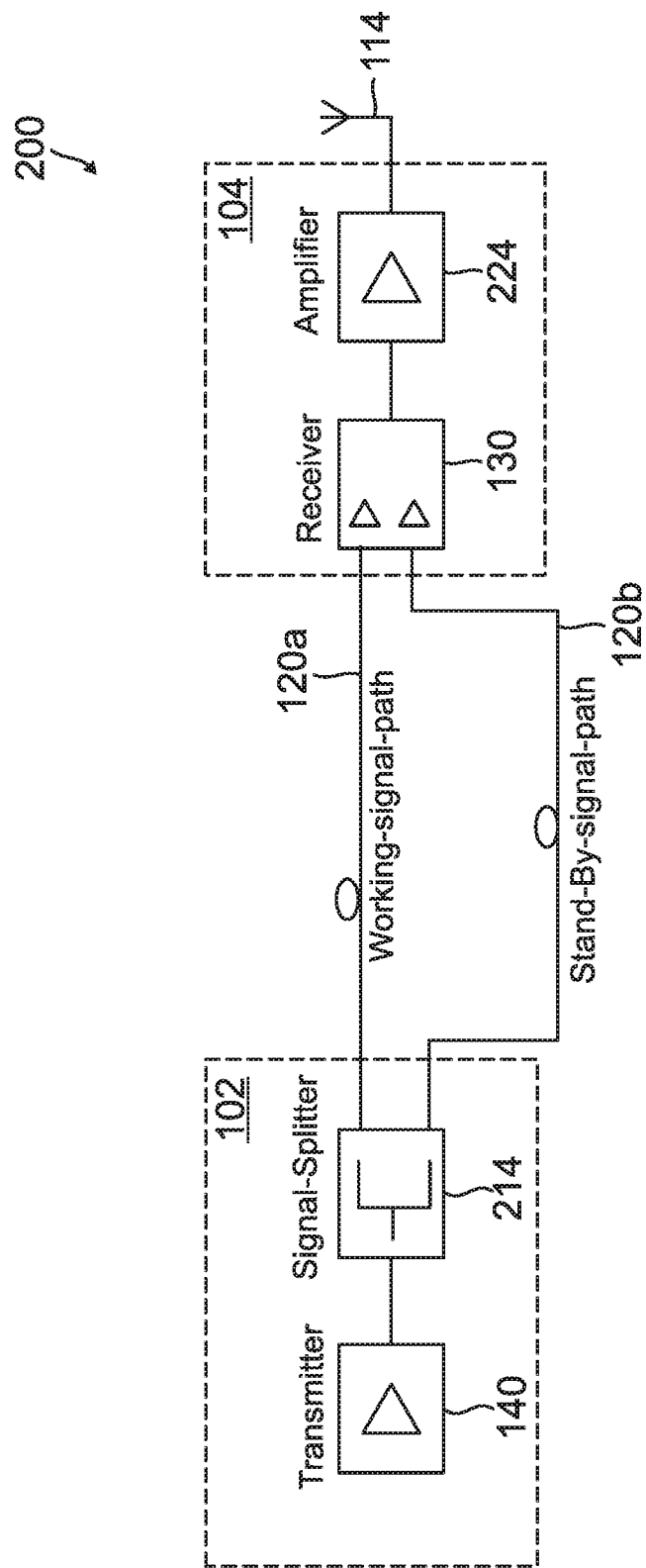
FIG. 2 is a block diagram of a dual path communication system according to one exemplary embodiment.

FIG. 2 illustrates a simplified block diagram of a dual path communication system 200 of an embodiment. The dual path communication system 200 illustrates the communication between two physically-separated nodes of a DAS such as, but not limited to, a master unit 102 in a head end and a remote antenna unit 104 using a first signal path 120a and a second signal path 120b. In particular, in this example, the master unit 102 is illustrated as including a transmitter 140 and the remote antenna unit 104 as including a receiver 130. Downlink transport signals are communicated from the master unit 102 to the remote antenna unit 104 in a downlink direction for use by the remote antenna unit 104 in generating the downlink RF signals that are radiated to the user equipment 112.

The master unit 102 is illustrated as including the transmitter 140 and a signal splitter 214. The signal splitter 214 has an input communicatively coupled to an output of the transmitter 140. The signal splitter 214 spits the signal at its input into two outputs. Each output of the signal splitter 214 is communicatively coupled to one of the signal paths 120a or 120b. The first and second paths 120a and 120b physically traverse two different, spatially separated paths so that if an area containing one of the paths becomes compromised and that path fails (or is otherwise unable to support communications at a required level of performance), the other path that is in a different unaffected area may still provide a communication link between the nodes of the DAS. Since the cables that form the paths are likely of different lengths, signals received at the receiver from the two paths will have different delays in time and phase. Embodiments deal with this with a two input circuit that synchronizes the signals as discussed below.

The remote antenna unit 104 is illustrated as including receiver 130 with two inputs and one output. An output of the receiver 130 is coupled to an input of an amplifier 224. An output of the amplifier 224 is communicatively coupled to antenna 114. In the embodiment shown in FIG. 2, the receiver 130 outputs analog signals at the appropriate RF frequency for communicating with the user equipment 112. In other embodiments, the receiver 130 outputs one or more analog signals at baseband or intermediate frequency, in which case the remote antenna unit 104 would also include appropriate frequency conversion circuitry to up-convert (or otherwise frequency convert) the analog signals to the appropriate RF frequency for communicating with the user equipment 112.

Figure 3:
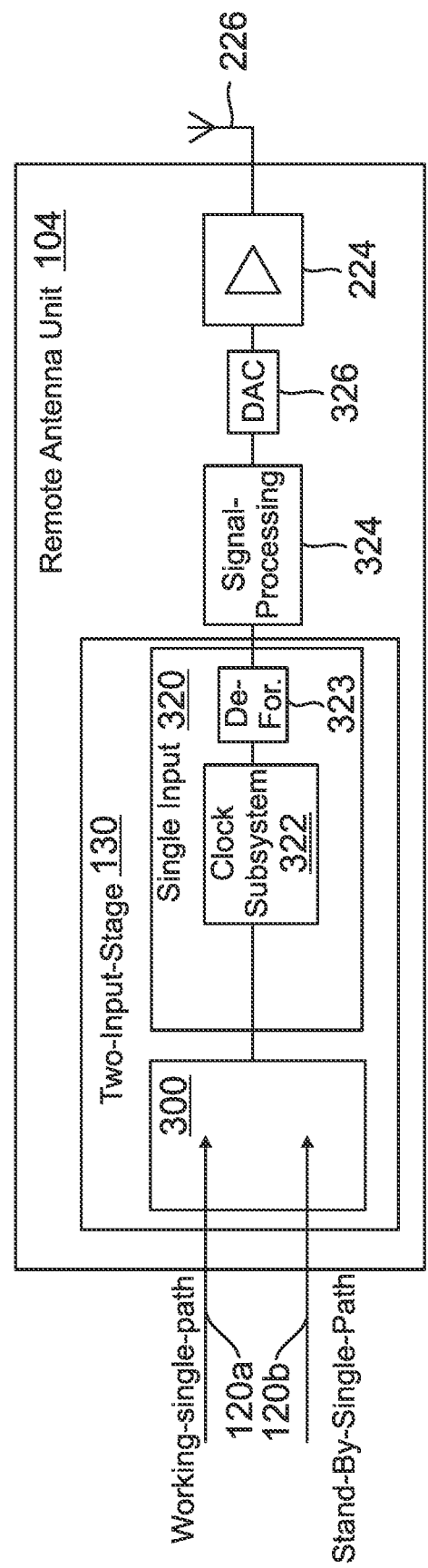
FIG. 3 is a block diagram of a remote antenna unit according to one exemplary embodiment.
Figure 4:
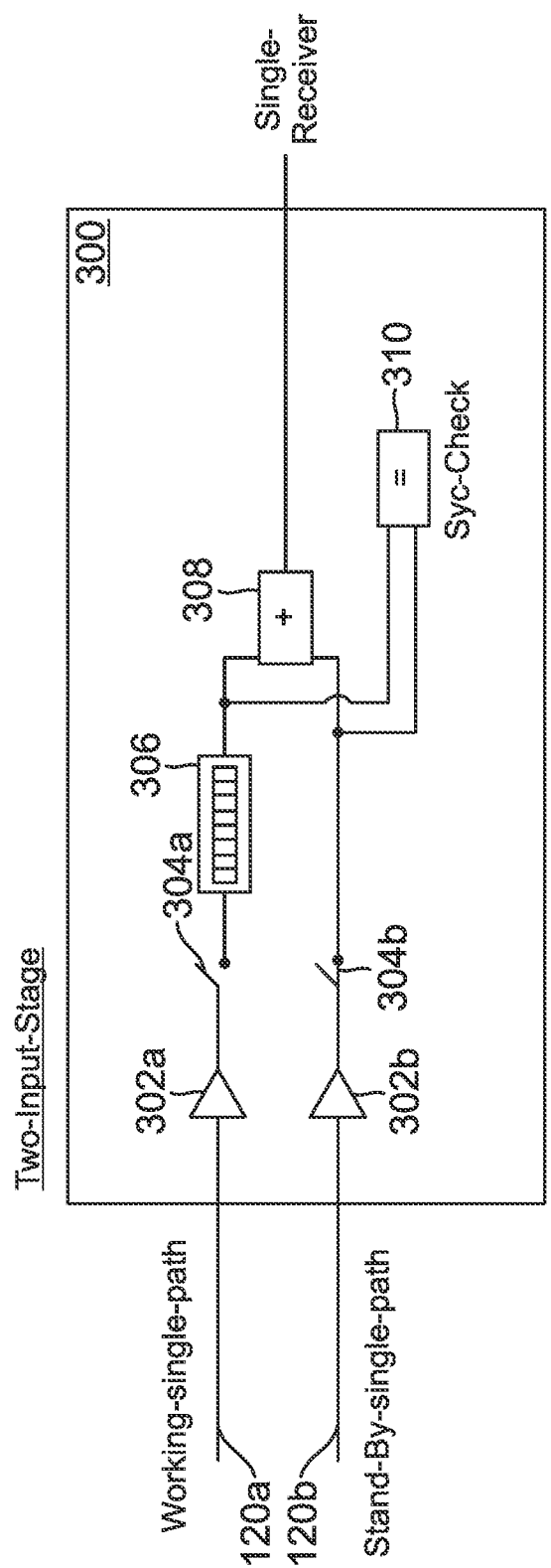
FIG. 4 is a block diagram of a two input stage circuit according to one exemplary embodiment.

FIG. 3 provides a block diagram of the remote antenna unit 104 further illustrating components of the dual input receiver 130 in an embodiment. As illustrated, the dual input receiver 130 includes a two input stage circuit 300 and a single input receiver 320. Each input of the two input stage circuit 300 are coupled to a respective one of the signal paths 120a or 120b. The two input stage circuit 300 in this example includes a signal processing member 302a and 302b for each input as illustrated in FIG. 4. In an embodiment in which optical signals are transmitted across the signal paths 120a and 120b, the signals processing members 302a and 302b include a first optical to electrical (O/E) converter 302a that is coupled to the first signal path 120a and a second O/E converter 302b coupled to the second signal path 120b. The O/E converters 302a and 302b convert optical signals in the first and second signal paths 120a and 120b into electrical signals. In one embodiment they include photo-diodes. In an embodiment where electrical signals are transmitted across the signals paths 120a and 120b (which may include CAT cable or coax cable) the signal processing members 302a and 302b include signal regenerators 302a and 302b to correct distortion in waveform shapes in the electrical signals.

An output of the two input stage 300 is coupled to the single input receiver 320. In one embodiment, the two input stage circuit 300 is just added on to a standard single input receiver. The single input receiver 320 in this example includes a clock subsystem 322. The clock subsystem 322 generates a system internal clock from the output of the two input stage circuit 300 (for example, by recovering a clock signal from the received transport signal and using a phase locked loop (PLL) to synchronize a locally generated clock signal to the recovered clock). This example of a single input receiver 320 further includes a deformatter 323 that has an input coupled to an output of the clock subsystem 322. The deformatter 323 takes digital data out of frames. In an embodiment, the deformatter 323 extracts the digital IQ samples and provides them to a signal processing system 324 of the remote antenna unit 104.

The signal processing system 324 is configured to digitally process digital samples extracted from the received transport signal (for example, by filtering, amplifying, attenuating, combining, re-sampling, and/or interpolating the digital samples). An output of the signal processing system 324 is couple to an input of a digital to analog converter (DAC) 326 that is configured to perform digital-to-analog conversion of the processed digital samples to produce one or more analog signals. The one or more analog signals are coupled to the one or more amplifiers 224 for amplification and radiation to the user equipment 112 via the antenna 114.

The two input stage circuit 300 of an example embodiment is illustrated in FIG. 4. The two input stage circuit 300 takes the signals from the first and second paths 120a and 120b, aligns them (shifting in time and phase) and then combines them into a single signal. This combined signal is provided to the receiver 320.

As discussed above, the two input stage circuit 300 includes first and second O/E converters 302a and 302b, in optical signal embodiments, that receive the transport signals communicated over the first and second signal paths 120a and 120b, respectively, and output respective O/E converted transport signals at a common signal level. The first O/E converter 302a is communicatively coupled to the first signal path 120a, and the second O/E 302b is communicatively coupled to the first signal path 120b. The two-input stage circuit 300 further includes a phase and time shifter 306 that is configured to adjust the phase and time delay of the converted signal output by one or both of the O/E converters 302a and 302b. In the embodiment shown in FIG. 4, the phase and time shifter 306 is illustrated as being coupled to only the first signal path 120a for ease of illustration; however, it is to be understood that in other embodiments, the phase and time shifter 306 can be coupled to either or both of the first and second signal paths 120a or 120b. The circuit 300 is configured to selectively couple the converted signal output by one or both of the first and second O/E converter 302a and 302b (or signal regenerators in an electronic signal embodiment) to the phase and time shifter 306.

The two-input stage circuit 300 further includes a combiner 308. The circuit 300 is configured to selectively provide the respective adjusted signals from the first and second O/E 302a and 302b to respective inputs of the combiner 308 via respective first and second-switches 304a and 304b. An output of the combiner 308 is communicatively coupled to the single receiver 320 discussed above. The combiner 308 is configured to "add" the adjusted signals to each other. The two-input stage circuit 300 is configured so that during "normal" operation when the same transport signal is being received via the two different signal paths 120a and 120b the transport signals are synchronized in time and phase with each other so that adding the two versions of the transport signal to each other using the combiner 308 effectively operates as a logical "OR" operation. In order to ensure that adding the two versions of the transport signal to each other effectively operates as a logical "OR" operation, the two version of the transport signal received via the two different signal paths 120a and 120b are synchronized in time and phase with each other.

In another embodiment, a detector may be used to detect a valid signal in the working signal path 120a. If the detector does not detect a valid signal, one or more switches 304a and 304b is used to switch to the standby signal path 120b. In this embodiment, the adder 308 would not be needed.

The two input stage circuit 300 further includes a signal synchronization check circuit 310 that is configured to check if the two version of the transport signal received via the two different signal paths 120a and 120b are synchronized in time and phase with each other. This circuit 310 can be implemented, for example, using a phase detector that outputs a signal indicative of whether the two versions of the transport signal received via the two different signal paths 120a and 120b are synchronized with each other, where the magnitude of the output signal is proportional to amount of offset in phase and time between the two versions of the received transport signal. If the two versions of the transport signal are not synchronized in time and phase with each other, a synchronization process is initiated as described below.

Figure 5:
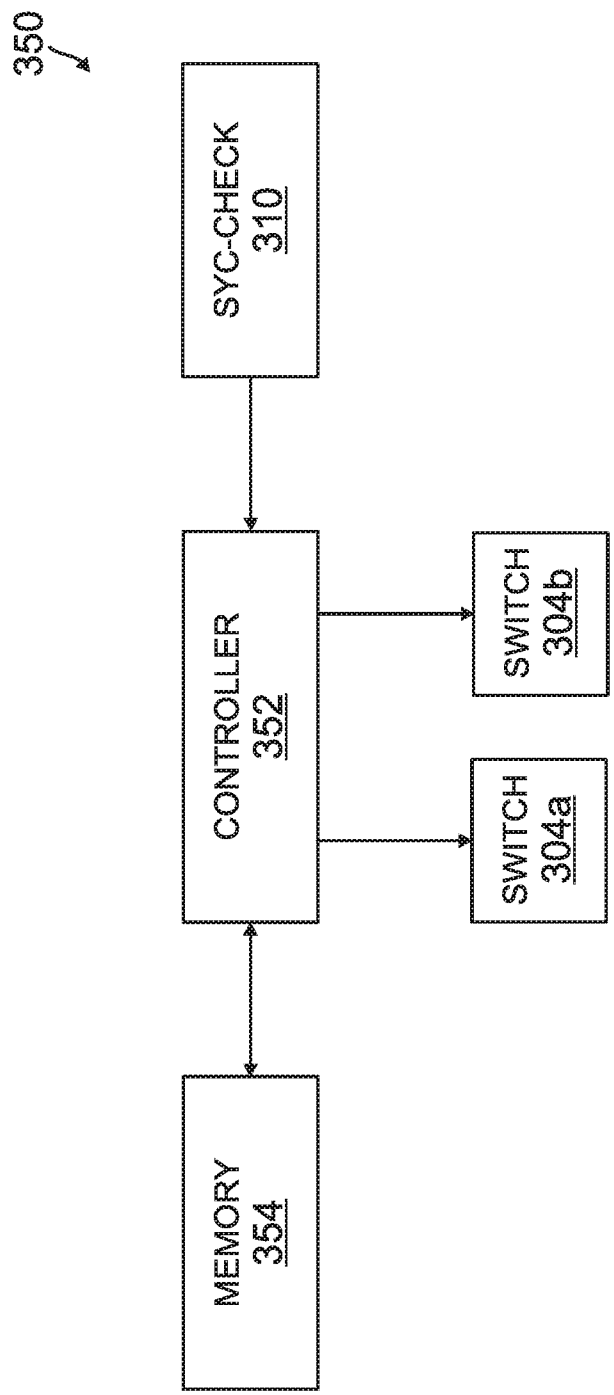
FIG. 5 is a block diagram of a switch activation circuit according to one exemplary embodiment.

An example of a switch activation circuit 350 is illustrated in FIG. 5. In this example, a controller 352 is communicatively coupled to the first and second switches 304a and 304b and is configured to activate the switches 304a and 304b as described below. Further in an embodiment, the controller 352 is in communication with the synchronization check circuit 310 and the shift register 306 and controls the shift forward or back based on an output of the synchronization check circuit 310.

In general, the controller 352 may include any one or more of a processor, microprocessor, a digital signal processor (DSP), an application specific integrated circuit (ASIC), a field program gate array (FPGA), or equivalent discrete or integrated logic circuitry. In some example embodiments, controller 352 may include multiple components, such as any combination of one or more microprocessors, one or more controllers, one or more DSPs, one or more ASICs, one or more FPGAs, as well as other discrete or integrated logic circuitry. The functions attributed to the controller 352 herein may be embodied as software, firmware, hardware or any combination thereof. The controller 352 may be part of a system controller or a component controller such as a remote antenna controller. Any such software or firmware can comprise program instructions that are stored (or otherwise embodied) on or in an appropriate non-transitory storage medium or media 353 from which at least a portion of the program instructions are read by the associated processor or other programmable device for execution thereby. The circuit 350 can also include memory 354 for storing the program instructions (and/or any related data) during execution by the processor or other programmable device.

Figure 6:
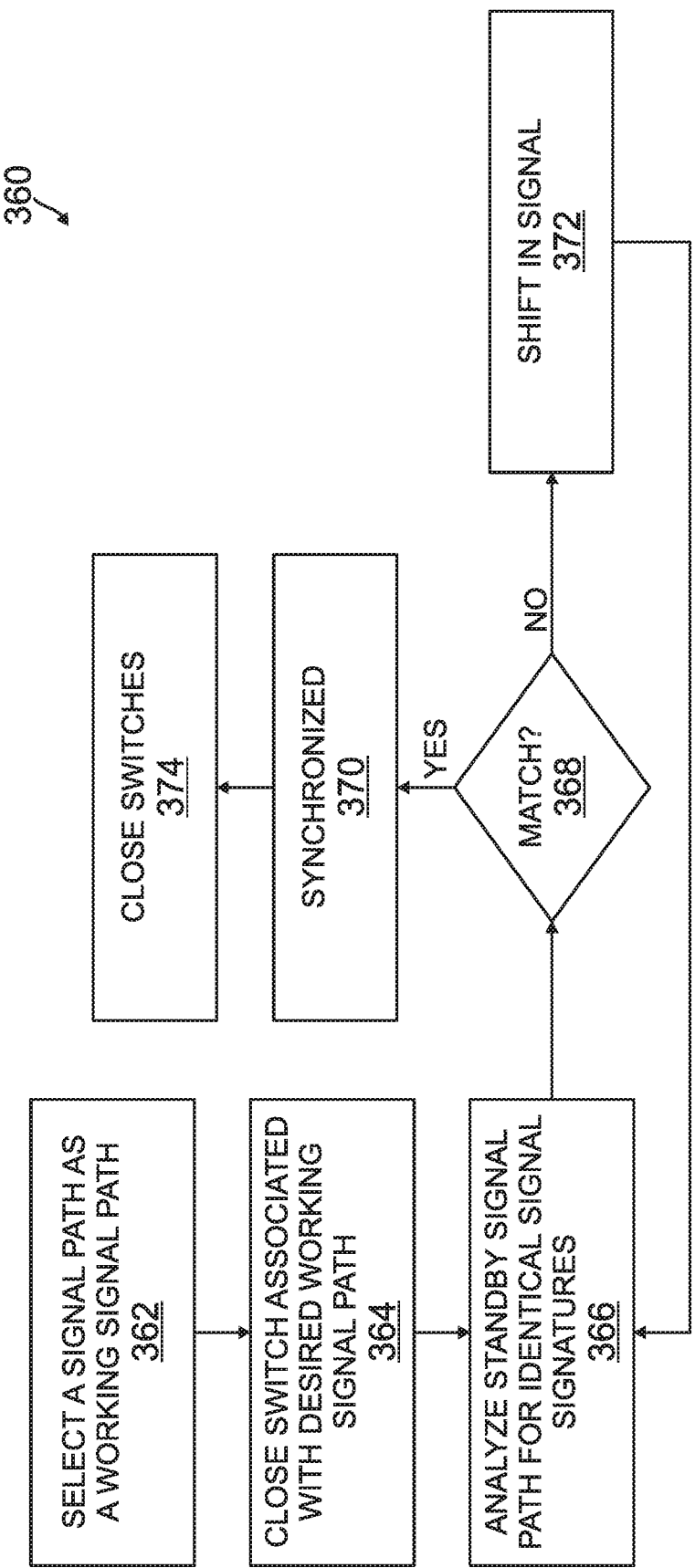
FIG. 6 is a synchronization flow diagram according to one exemplary embodiment.

The two input stage circuit 300 first synchronizes the signals in the working signal path 120a and the standby signal path 120b. An example of a synchronization flow diagram 360 is illustrated in FIG. 6. The synchronization flow diagram 360 is provided as a series of sequential acts or blocks. The sequence of the acts or blocks may be different in other embodiments. Hence, embodiments are not limited to the sequence of acts or blocks as illustrated in FIG. 6.

In the synchronization flow diagram 360 synchronization starts by first selecting one signal path 120a or 120b to the working signal path (block 362) and configuring the switches 304a and 304b accordingly to provide the version of the transport signal received via the selected working signal path to the receiver 130 (block 364). For example, if the first signal path 120a is selected to be the working signal path, switch 304a is closed to communicatively couple the first signal path 120a to a first input of the combiner 308. As a result, the version of the transport signal received via the selected working signal path is provided to the receiver 130 so that it can lock onto the transport signal in order to recover a clock signal for generating a system internal clock. At block 366, the two input stage circuit 300 compares the version of the transport signal received via the selected working signal path to the version of the transport signal received via the alternative signal path (also referred to here as the "standby" signal path) to determine if the two versions of the transport signal are synchronized with each other. If the two versions are not synchronized (checked at block 368), the phase and time shifter circuit 306 is used to adjust the phase and/or time delay of one or both of the versions of the transport signal received via the working and standby signal paths (block 370). This is done in order to reduce the offset in phase and time between the versions of the transport signal. The amount of adjustment can be determined as a function of an output signal provided by the synchronization check circuit 310. The phase and time delay of the two versions of the transport signal are adjusted until they are synchronized with each other (looping back to block 366).

Once the phase and time delay of the two versions of the transport signal are synchronized with each other, the switches 304a and 304b are configured accordingly so that the two versions of the transport signal received via the working and standby signal paths 120a and 120b are communicatively coupled to the respective inputs of the optical combiner 308 (block 374). The combiner 308 then combines the two synchronized versions of the transport signal received via the first and second paths 120a and 120b. Since, the two versions of the transport signal are fully in synchronized in phase and time delay, the adder 308 effectively acts as a logical "OR" function. Accordingly, if one signal path fails the adder 308 will still output the correct signal based on the other signal. Because the two versions of the transport signal are synchronized, there is no need for the receiver 130 to take the time to repeat the process of locking onto a transport signal in order to recover a clock signal for generating a system internal clock. Accordingly, there is no interruption of the wireless service provided via that remote antenna unit 104 when a signal path fails. This configuration reduces the cost of implementing signal path redundancy by avoiding the need to provide two full receivers and provides a zero interruption switch over by avoiding the need to lock onto the transport signal in the event of failover.

A similar configuration as that illustrated in FIGS. 2 through 5 between nodes may be used in the uplink direction. As discussed above, uplink DAS circuitry in each master unit 102, remote antenna unit 104, and expansion unit 108, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the feature described above. Uplink digital samples derived from uplink analog RF signals transmitted by the user equipment 112 are generated and communicated between the remote antenna units 104 and the master units 102. Further in the uplink direction, the master unit 102 receives upstream streams of digital IQ samples from various remote antenna units 104, combines the digital IQ samples (for example, by digitally summing corresponding IQ samples) if necessary, converts (by re-sampling, synchronizing, combining, separating, gain adjusting, etc.) the combined digital IQ into upstream streams of digital IQ samples compatible with the one or more base stations 110, and communicates the resulting combined digital IQ samples to the one or more base stations 110.

Figure 7:
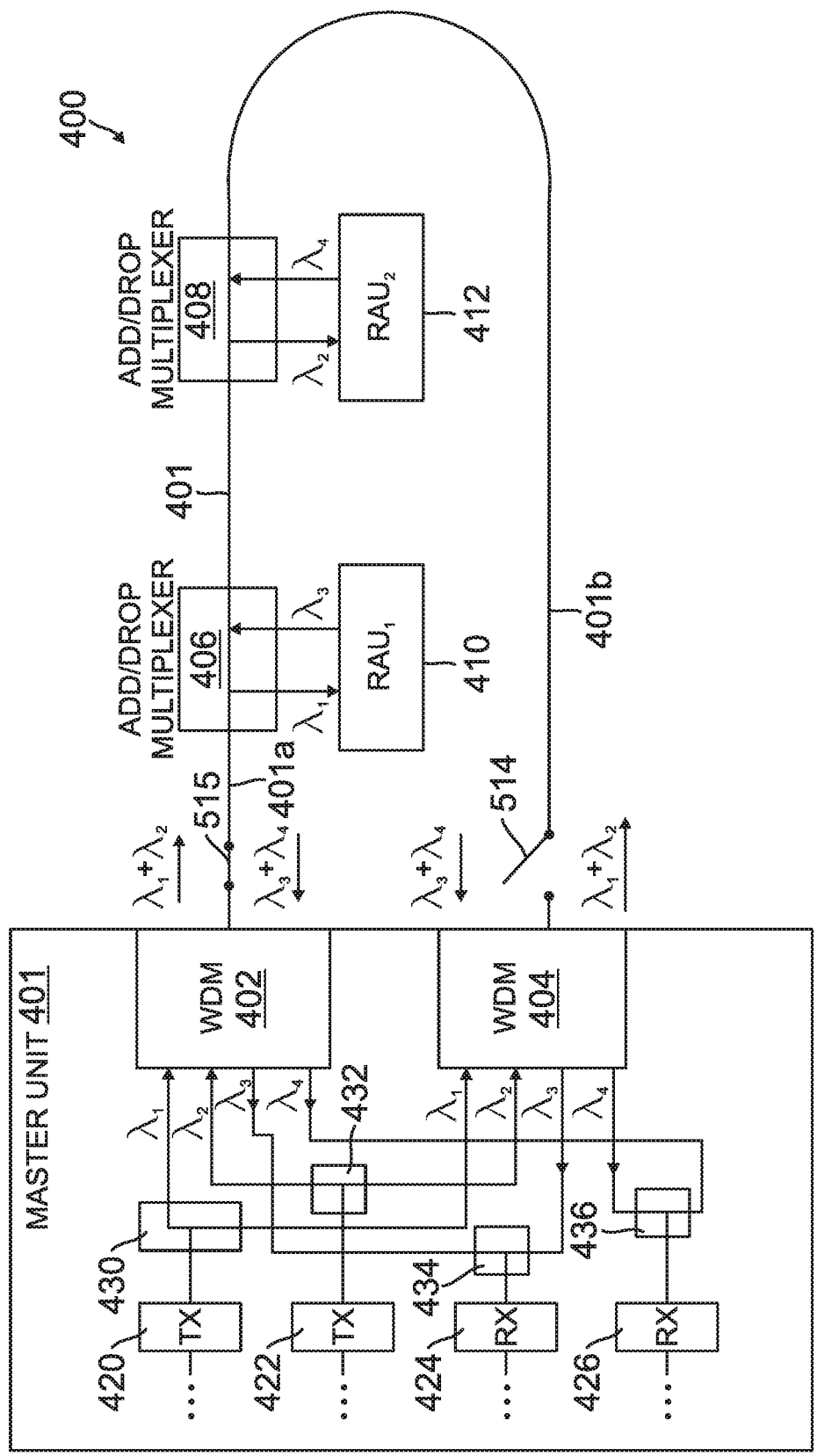
FIG. 7 is a block diagram of digital fiber redundancy system according to one exemplary embodiment.

FIG. 7 illustrates another example embodiment of a digital fiber redundancy system 400 in a DAS. This example embodiment uses a ring configuration or topology with a single fiber path 401 that is designed to allow communication links between nodes in both clockwise and counter clockwise directions of the ring configuration. The Example of FIG. 7 illustrates the communication nodes as including a master unit 401 and remote antenna units 410 and 412.

Similar to the embodiment discussed above, the downlink DAS circuitry and uplink DAS circuitry in each master unit 401 and remote antenna unit 410 and 412 respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry and uplink DAS circuitry may share common circuitry and/or components.

The example master unit 401 is illustrated in FIG. 7 as including transmitters 420 and 422 using in a downlink direction and receivers 424 used in an uplink direction. Transmitter 420 is configured to transmit a first optical downlink transport signal $\lambda_1$ have a first wavelength to an input of a first optical signal splitter 430. A first output of the first optical splitter 430 is coupled to a first input of a first wave division multiplexer (WDM) 402. A second output of the first optical splitter 430 is coupled to a first input of a second WDM 404. Transmitter 422 is configured to transmit a second optical downlink transport signal $\lambda_2$ having a second wavelength to an input of a second optical signal splitter 432. A first output of the second optical splitter 432 is coupled to a second input of the first WDM 402. A second output of the second optical splitter 432 is coupled to a second input of a second WDM 404.

Further, for the uplink direction, the first WDM 402 has a first output coupled to a first input of a first optical signal combiner 434. The second WDM has a first output coupled to a second input of the first optical combiner 434. The first output of the first WDM 402 and the first output of the second WDM output a third optical uplink transport signal $\lambda_3$ having a third wavelength. An output of the first optical combiner 434 is coupled to a first receiver 424. The first WDM 402 has a second output coupled to a first input of a second optical signal combiner 436. The second WDM has a second output coupled to a second input of the second optical combiner 436. The second output of the first WDM 402 and the second output of the second WDM output a fourth optical uplink transport signal $\lambda_4$ having a fourth wavelength. An output of the second optical combiner 436 is coupled to a second receiver 426.

The downlink transport signals $\lambda_1$ and $\lambda_2$ and uplink transport signals $\lambda_3$ and $\lambda_4$ to and from the remote antenna units 410 and 412 are communicated through the single fiber path 401. The number of remote units and the number of transport signals may vary depending on the application.

This example embodiment of the digital fiber redundancy system 400 further includes optical add drop multiplexers (ADMs) 406 and 408. The ADMs 406 and 408 in an embodiment include fiber optic filters used to pass the respective downlink $\lambda_1$ and $\lambda_2$ and uplink signals $\lambda_3$ and $\lambda_4$ to and from the respective remote antenna units 410 and 412.

A first portion 401a of the fiber path 401 is spatially separated from a second portion 401b of the of the fiber path 401 such that if the first portion 401a of the fiber path 104 is compromised, the downlink transport signals $\lambda_1$ and $\lambda_2$ and the uplink transport signals $\lambda_3$ and $\lambda_4$ can still be communicated between the master unit 401 and the respective remote antenna units 410 and 412. In one example embodiment, optical switches 514 and 515 are used to communicatively couple the first portion 401a and the second portion 401b of the fiber path 401 to the respective WDM 402 or 404 based on a determination of which portion 401a and 410a is working. In one embodiment the switches 514 and 515 are controlled based on a detected optical signal power on one or more wavelengths. In the example of FIG. 7, switch 515 is closed to use the first portion 401a of the fiber path 401 to communicatively couple the downlink transport signals $\lambda_1$ and $\lambda_2$ and the uplink transport signals $\lambda_3$ and $\lambda_4$ between the master unit 401 and the respective remote antenna units 410 and 412.

Figure 8:
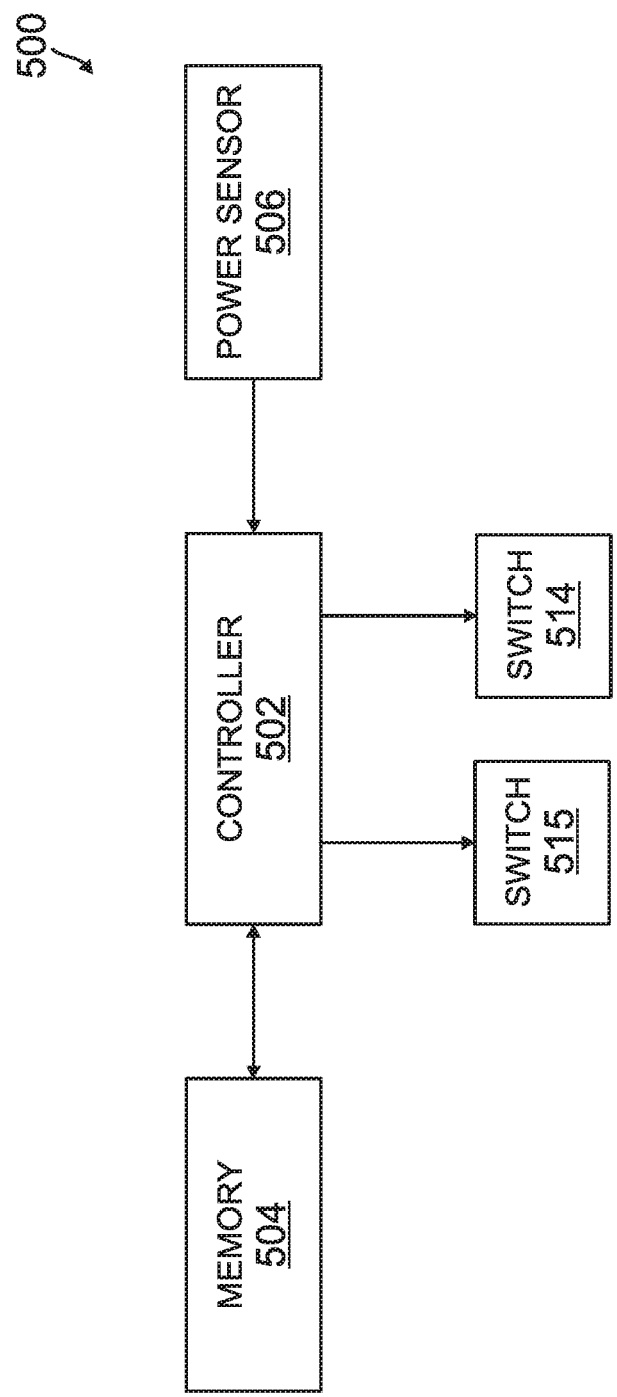
FIG. 8 illustrates a switch activation circuit according to another exemplary embodiment.

An example of a switch activation circuit 500 is illustrated in the FIG. 8. The switch activation circuit 500 includes a controller 502 that is in communication with at least one power sensor 506. The at least one power sensor 506 senses the signal power level in at least one of the first portion 401a and the second portion 401b of the fiber path 401. The switch activation circuit 500 further includes a memory to store operating instructions implemented by the controller 502. Based on power signal measurements from the at least one power sensor 506 and the operating instructions stored in the memory 504, the controller 502 controls the activation of the switches 514 and 515.

In general, the controller 502 may include any one or more of a processor, microprocessor, a digital signal processor (DSP), an application specific integrated circuit (ASIC), a field program gate array (FPGA), or equivalent discrete or integrated logic circuitry. In some example embodiments, controller 502 may include multiple components, such as any combination of one or more microprocessors, one or more controllers, one or more DSPs, one or more ASICs, one or more FPGAs, as well as other discrete or integrated logic circuitry. The functions attributed to the controller 502 herein may be embodied as software, firmware, hardware or any combination thereof. The controller 502 may be part of a system controller or a component controller such as a master unit controller or remote antenna unit controller. Any such software or firmware can comprise program instructions that are stored (or otherwise embodied) on or in an appropriate non-transitory storage medium or media 504 from which at least a portion of the program instructions are read by the associated processor or other programmable device for execution thereby. The circuit 500 can also include memory 504 for storing the program instructions (and/or any related data) during execution by the processor or other programmable device.

Figure 9:
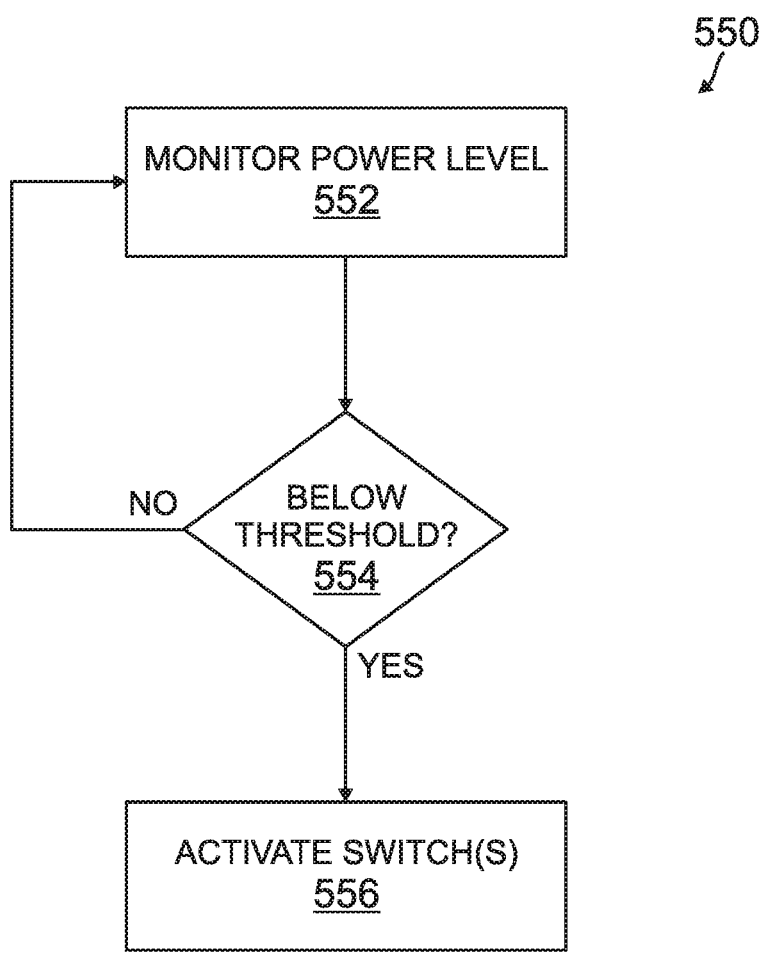
FIG. 9 is an activation flow diagram according to another exemplary embodiment.

An example of an activation flow diagram 550 in this example embodiment is illustrated in FIG. 9. The activation is provided as a series of sequential acts or blocks. Other embodiments may include further acts or blocks in different sequential orders. Hence, embodiments are not limited to the blocks and sequential order set out in FIG. 9.

As the activation flow diagram 550 illustrates, in operation, the at least one power sensor 506 is positioned to monitor the power level of at least one wavelength in at least one of the first portion 401a of the fiber path 401 and the second portion 401b of the fiber path 401 at block (552). In one embodiment, at block (554) measured power levels are compared against a threshold. If a measured power level does not fall below the threshold, the power sensor continues monitoring the power level at block (552). If a power level falls below the set threshold, the controller 502 activates at least one of the switches 514 and 515 at block (556). For example, if the signal level in the first portion 401a of the fiber path 410 is below the threshold, closing switch 514 communicatively couples the second multiplexer/demultiplexer 404 to the second portion 401b of the fiber path 401. This allows the second portion 401b of the communication link 401 to provide the communication coupling between the remote antenna units 410 and 412 and master unite 401. Since, the first WDM 402 and the second WDM 404 are fed the same communication signals (in the downlink $\lambda_1$ and $\lambda_2$ and in the uplink signals $\lambda_3$ and $\lambda_4$) between the master unit 401 and the respective remote antenna units 410 and 412, communication is maintained after the closing of switch 514 through the second portion 401b of the fiber path 401.

EXAMPLE EMBODIMENTS

Example 1 is a digital fiber redundancy system for a distributed antenna system, the system includes a first communication link, a second communication link, a first communication node and a second communication node. The first communication link traverses first path. The second communication link traverses a second path. The second path is spatially separated from the first path. The first communication node is communicatively coupled to transmit the same signal through both the first communication link and the second communication link. The second communication node has a receiver system that is communicatively coupled to receive the signals transmitted through the first and second communication links. The receiver system is configured to synchronize delay and phase differences between the received signals and then combine the signals together to generate a single output.

Example 2 includes the system of Example 1, wherein the receiver system includes a two input stage circuit. The two input stage circuit includes at least one phase and time shifter and a combiner. The at least one phase and time shifter is communicatively coupled to one of the first and second communication links. The phase and time shifter is configured to adjust the delay and phase of the received signals in one of the first and second communication links. The combiner is used to combine the signals. The combiner has a first input that is commutatively coupled to the first communication link and a second input that is communicatively coupled to the second communication link. The combiner further includes an output used to generate the single output of the receiver system.

Example 3 includes the system of Example 2, wherein the two input stage circuit further includes a synchronization check circuit having a first input commutatively coupled to the first communication link, a second input communicatively coupled to the second communication link and a third input coupled to the output of the adder.

Example 4 includes the system of any of the Examples 2-3, wherein the two input stage circuit further includes a first switch that is positioned to selectively open and close the first communication link to the first input of the combiner and a second switch that is positioned to selectively open and close the second communication link to the second input of the combiner.

Example 5 includes the system of any of the Examples 2-4, wherein the two input stage circuit further includes a first and second optical to electrical converters. The first optical to electrical converter is communicatively coupled to the first communication link. The second optical to electrical converter is communicatively coupled to the second communication link.

Example 6 includes the system of any of the examples 2-4, wherein the two input stage circuit further includes a first and second signal regenerators. The first signal regenerator is communicatively coupled to the first communication link and the second signal regenerator communicatively coupled to the second communication link.

Example 7 include the system of any of the Examples 2-6 wherein the receiver system includes a receiver including a clock subsystem and a deformatter. The clock subsystem is used to synchronize a locally generated clock signal from a recovered clock signal. The clock subsystem has an input that is communicatively coupled to the output of the two input stage receiver. The deformatter is used to extract digital in-phase and quadrature samples from the electrical signals. The deformatter is commutatively coupled to an output of the clock subs subsystem.

Example 8 includes the system of Example 7, wherein the remote antenna unit further includes a signal processing circuit, a digital to analog converter and an analog amplifier. The signal processing circuit is used to digitally process digital samples extracted from an output of the clock subsystem. The digital to analog converter has an input coupled to an output of the signal processing circuit. The analog amplifier is communicatively coupled to an output of the digital to analog converter. An output of the analog amplifier is communicatively coupled to at least one antenna.

Example 9 includes the system of any of the Examples 1-8, wherein the first and second communication links are one of fiber optic cables, coax and CAT-cables.

Example 10 includes the system of any of the Examples 1-9, wherein the first and second communication components are one of a master unit, an expansion unit and a remote antenna unit.

Example 11 is a method of operating a distributed antenna system with a redundancy system that includes a first communication node and a second communication node that are in communication with each other via working signal path and a standby signal path, the working signal path being spatially separated from the standby signal path, the method includes synchronizing delay and phase differences between signals in the working signal path and the standby signal path; combining the signals in the working signal path with the signals in the standby signal path to generate a single output signal; and processing the single output signal.

Example 12 includes the method of Example 11 wherein processing the signals further includes synchronizing a locally generated clock signal from a recovered clock signal from the processed single output signal; extracting digital in-phase and quadrature samples from the processed single output signal; processing the digital samples; and converting the digital samples into an analog signal.

Example 13 includes the method of any of the Examples 10-12, wherein synchronizing the delay and phase difference further includes closing a first switch in the working signal path; analyzing the signal in the standby signal path for identical signatures of the signals in the working signal path; and when there is not a match of identical signatures, shifting the signal in the working signal path.

Example 14 includes the method of Example 13, further including when there is a match of identical signatures, closing a second switch to communicatively couple signals in the standby signal path to an adder that adds the signals in the working signal path to the signals in the standby signal path.

Example 15 includes the method of any of the Examples 10-14, wherein the at least two communication components of the distributed antenna system are at least a master unit and a remote antenna unit.

Example 16 is a redundancy system for a distributed antenna system. The system includes a first communication node, at least one second communication node a communication link, at least one sensor, at least one switch and a controller. The communication link communicatively couples the first communication node to the at least one second communication node in a ring topography. The communication link has a first portion that is spatially separated from a second portion. The at least one sensor is configured to measure signal power level of communication signals in at least one of the first portion and the second portion of the communication link. The at least one switch is positioned within at least one of the first portion and the second portion of the communication link to selectively communicatively couple communication signals between the first communication node and the at least one second communication node through one of the first portion and the second portion of the communication link. The controller is in communication with the at least one sensor. The controller is configured to activate the at least one switch upon the at least one sensor measuring a signal power level in one of the first portion and the second portion of the communication link below a threshold.

Example 17 includes the system of Example 16, wherein the first communication node is a master unit and the at least one second communication node is at least one remote antenna unit.

Example 18 includes the system of any of the Examples 15-17, the first communication node including a first wavelength division multiplier, a second wavelength division multiplier, at least one transmitter, a splitter for each transmitter, at least one receiver and a combiner for each receiver. The first wavelength division multiplier has an output that is communicatively coupled to the first portion of the communication link. The second wavelength division multiplier has an output that is communicatively coupled to the second portion of the communication link. Each splitter has an input that is communicatively coupled to an output of an associated transmitter. Each splitter has a first output that is commutatively coupled to an input of the first wavelength division multiplexer and a second output that is communicatively coupled to an input of the second wavelength division multiplexer. Each combiner has an output that is communicatively coupled to an input of an associated receiver. Each combiner has a first input that is coupled to an output of the first wavelength division multiplexer and a second input that is communicatively coupled to an output of the second wavelength division multiplexer.

Example 19 includes the system of any of the Examples 15-18, wherein the at least one second communication node includes at least two second communication nodes, the system further includes an add/drop multiplexer for each second communication node. Each add/drop multiplexer communicatively coupled to the communication link. Each add/drop multiplexer is configured to pass communication signals in the communication link to an associated second communication node.

Example 20 is a method of operating a redundancy system for a distributed antenna system having communication nodes selectively coupled in a ring topology via at least one switch, the method including monitoring power levels of communication signals in a first portion of a communication link that communicatively couples the communication nodes in the ring topology; and when a power level is detected below a threshold, activating the at least one switch to allow communications between the communication nodes through a second portion of the communication link that is spatially separated from the first portion of the communication link.

Example 21 includes the method of Example 20 wherein the communication components include at least one master unit and a plurality of remote antenna units. The method further includes combining downlink messages from the master unit to the first portion of the communication link with a first wave division multiplexer; separating uplink messages to the maser unit from the first portion of the communication link with the first wave division multiplexer; and combining downlink messages from the master unit to the second portion of the communication link with a second wave division multiplexer; separating uplink messages to the maser unit from the second portion of the communication link with the second wave division multiplexer.

Example 22 includes the method of Example 21, further including passing select signals to and from the communication link to a select remote antenna unit with an add/drop multiplexer.

Example 23 includes the method of Example 21 further including splitting a signal from each transmitter in the master unit that is designed to communicate signals to an associated remote antenna unit to an input of each of the first and second wave division multiplexer; combining an associated output of each of the first and second wave division multiplexer; an coupling the combined outputs of each of the first and second wave division multiplexer to an associated receiver.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A redundancy system for a distributed antenna system, the system comprising:
   a first communication link traversing first path;
   a second communication link traversing a second path, the second path being spatially separated from the first path;
   a first communication node communicatively coupled to transmit signals having the same signal information through both the first communication link and the second communication link; and
   a second communication node having a receiver system that is communicatively coupled to receive the signals transmitted through the first and second communication links, the receiver system configured to synchronize delay and phase differences between the signals and then combine the signals together to generate a single output;
   wherein the receiver system includes a two input stage circuit including,
      a phase and time shifter communicatively coupled to one of the first and second communication links, the phase and time shifter configured to adjust the delay and phase of the received signals in one of the first and second communication links,
      a synchronization check circuit having a first input communicatively coupled to the first communication link and a second input communicatively coupled to the second communication link of the combiner, an output of the synchronization circuit used in determining an amount of adjustment made by the phase and time shifter, and
      a combiner to combine the signals, the combiner having a first input communicatively coupled to the first communication link and a second input communicatively coupled to the second communication link, the combiner further including an output used to generate the single output of the receiver system.

2. The system of claim 1, wherein the two input stage circuit further comprises:
   a first switch positioned to selectively open and close the first communication link to the first input of the combiner; and
   a second switch positioned to selectively open and close the second communication link to the second input of the combiner.

3. The system of claim 1, wherein the two input stage circuit further comprises:
   a first optical to electrical converter communicatively coupled to the first communication link; and
   a second optical to electrical converter communicatively coupled to the second communication link.

4. The system of claim 1, wherein the two input stage circuit further comprises:
   a first signal regenerator communicatively coupled to the first communication link; and
   a second signal regenerator communicatively coupled to the second communication link.

5. The system of claim 1, wherein the receiver system includes a receiver comprising:
   a clock subsystem to synchronize a locally generated clock signal from a recovered clock signal in the output of the combiner of the two input stage circuit; and
   a deformatter to extract digital in-phase and quadrature samples from signals in an output of the clock subsystem.

6. The system of claim 5, further comprising:
   a signal processing circuit to digitally process digital samples extracted from an output of the deformatter;
   a digital to analog converter having an input coupled to an output of the signal processing circuit; and
   an analog amplifier communicatively coupled to an output of the digital to analog converter, an output of the analog amplifier communicatively coupled to at least one antenna.

7. The system of claim 1, wherein the first and second communication links are one of fiber optic cables, coax and CAT-cables.

8. The system of claim 1, wherein one of the first and second communication nodes is located in one of a master unit, an expansion unit and a remote antenna unit.

9. A method of operating a distributed antenna system with a redundancy system that includes a first communication node and a second communication node that are in communication with each other via working signal path and a standby signal path, the working signal path and standby path used to communicate signals having the same signal information, the working signal path being spatially separated from the standby signal path, the method comprising:

synchronizing delay and phase differences between the signals in the working signal path and the standby signal path, wherein synchronizing the delay and phase differences further includes, analyzing the signals in the standby signal path for identical signatures of the signals in the working signal path, when there is not a match of identical signatures, shifting at least one of a phase and a time delay of the signals in the working signal path, and when there is a match of identical signatures, communicatively coupling signals in the standby signal path to a combiner that adds the signals in the working signal path to the signals in the standby signal path to generate a single output signal; and processing the single output signal.

10. The method of claim 9, wherein processing the signals further comprises:

synchronizing a locally generated clock signal from a recovered clock signal from the processed single output signal;

extracting digital in-phase and quadrature samples from the processed single output signal;

processing the digital samples; and converting the digital samples into an analog signal.

11. The method of claim 9, wherein one of the first communication node and the second communication node of the distributed antenna system is located in one of a master unit and a remote antenna unit.

* * * * *